United States Patent [19]

Gill

[11] Patent Number: 5,467,881

[45] Date of Patent: Nov. 21, 1995

[54] METHOD OF MANUFACTURING AN MR READ HEAD WHICH ELIMINATES LEAD-TO-SHIELD SHORTS AT THE ABS OF THE MR READ HEAD

[75] Inventor: Hardayal S. Gill, Portola Valley, Calif.

[73] Assignee: International Business Machines Corporation, Armonk, N.Y.

[21] Appl. No.: 267,269

[22] Filed: Jun. 28, 1994

[51] Int. Cl.⁶ ............................................. B44C 1/22
[52] U.S. Cl. .................. 216/22; 216/41; 216/67
[58] Field of Search ........................ 156/643, 645, 156/655, 656, 659.1, 667; 29/603; 360/113; 216/22, 41, 49, 63, 67

[56] References Cited

U.S. PATENT DOCUMENTS

| | | | |
|---|---|---|---|
| 4,071,868 | 1/1978 | Kaminaka et al. | 360/113 |
| 4,130,847 | 12/1978 | Head et al. | 360/122 |
| 4,443,294 | 4/1984 | Suenaga et al. | 156/656 |
| 4,918,554 | 4/1990 | Bajorek et al. | 360/113 |
| 4,939,837 | 7/1990 | Krounbi | 29/603 |
| 5,075,956 | 12/1991 | Das | 29/603 |
| 5,156,704 | 10/1992 | Kemp | 156/655 |
| 5,212,609 | 5/1993 | Yuito et al. | 216/22 X |

FOREIGN PATENT DOCUMENTS

4-302815  10/1992  Japan ................. G11B 5/66

*Primary Examiner*—William Powell
*Attorney, Agent, or Firm*—Baker, Maxham, Jester & Meador

[57] ABSTRACT

A method is provided for eliminating lead to shield electrical shorts at the ABS of an MR read head. The electrical shorts are eliminated by removing streaks of conductive material which extend between the conductive leads and the conductive shields across first and second insulative gap layers. A photoresist layer is formed over the edge surface of the MR stripe at the ABS along with coextensive widths of edge surfaces of other thin film surfaces at the ABS. The uncovered edge surfaces of the remaining thin film layers at the ABS are then subjected to reactive ion etching to remove about 500Å of the uncovered edge surfaces. With a photoresist layer approximately 10 μm thick, the edge surface of the MR stripe is fully protected during this process. After the etching step, the photoresist layer is removed and the MR read head is free of electrical shorts between the leads and the shields. This method is especially adaptable for batch production of MR read heads where the MR stripes are arranged in rows and columns on a wafer. Strips of photoresist are formed over the columns of MR stripes for their protection while the unwanted streaks of conductive material between the leads and the shields are removed by the aforementioned etching process.

13 Claims, 7 Drawing Sheets

METHOD OF MANUFACTURING AN MR READ HEAD WHICH ELIMINATES LEAD-TO-SHIELD SHORTS AT THE ABS OF THE MR READ HEAD

BACKGROUND OF THE INVENTION

1. Field of the Invention

The present invention relates a method of manufacturing that eliminates lead to shield shorts at the ABS of an MR read head and, more particularly, that eliminates electrical shorts which are caused by conductive material bridging between conductive leads and conductive shields at the ABS.

2. Description of the Related Art

A magnetoresistive (MR) read head employs a magnetoresistive thin layer, hereinafter referred to as an MR stripe, which changes resistance in response to a magnetic field from a rotating magnetic disk. The change in resistance forms the readback signal produced by the MR head. The readback response of the MR stripe is based on how well the resistance change follows the change in magnetic field strength.

In a typical MR read head, the MR stripe is a thin film layer which is sandwiched between bottom and top insulation gap layers G1 and G2 which, in turn, are sandwiched between bottom and top shield layers S1 and S2. The distance between the shield layers is called the "read gap". The smaller the read gap, the greater the resolution of the MR read head.

The MR stripe is typically fabricated from Permalloy, which is NiFe. Preferably, NiFe is also used to fabricate the shield layers S1 and S2 of the MR read head. Lead layers L1 and L2 of the MR read head, which are connected to opposite lateral ends of the MR stripe, are fabricated from a conductive material, such as Ta, Au or Ru. The first and second gap layers G1 and G2 of the MR read head, which separate the lead layers L1 and L2 from the first and second shield layers S1 and S2, are fabricated from an insulative material, such as $Al_2O_3$. The insulative capability of the gap layers prevents an electrical short between either of the lead layers and either of the first and second shield layers. If an electrical short occurs, sense current is shunted to one or more of the shield layers, causing a decrease in the amount of sense current conducted through the MR stripe. The result is that readback signal amplitude may be significantly reduced.

After the MR stripe, the pair of conductive leads, the pair of insulation gap layers G1 and G2, and the pair of shield layers S1 and S2 are fabricated, all of these layers are lapped to form the ABS. After lapping, each of the MR stripe, the conductive leads L1 and L2, the first and second insulative gap layers G1 and G2, and the first and second shield layers S1 and S2 has an edge surface which forms a portion of the ABS. As is known, the lapping process sometimes streaks conductive material between the conductive leads and the shield layers to form a current-conducting short circuit path therebetween. This conductive material may streak across one or more of the first and second insulative gap layers G1 and G2. In the prior art, streaking that results from the lapping process has significantly decreased the production run yields of MR read heads. MR read heads which are tested and found to have electrical shorts are simply discarded. This is because an electrical short circuit shunts the sense current to the shields, and produces noise during operation of the MR read head. It would be desirable if the yield from these production runs could be increased by salvaging the MR read heads which have electrical shorts across their insulative gap layers at the ABS.

SUMMARY OF THE INVENTION

The present invention eliminates the formation of electrical short circuits between the conductive leads L1 and L2 and the first and second shield layers S1 and S2, which, in the prior art, result from lapping to form the ABS. This is accomplished by a method that removes the streaks of conductive material at the ABS which extend between the conductive leads L1 and L2 and the shield layers S1 and S2. In the method of the present invention, the edges of the first and second insulative gap layers G1 and G2 are etched at the ABS to remove any conductive material bridging between the pair of leads L1 and L2 and the first and second conductive shield layers S1 and S2. Prior to performing the etching step, however, the edge of the MR stripe at the ABS must be protected so it will not be etched. This is accomplished by forming a resist layer on top of the edge surface of the MR stripe at the ABS. In the preferred embodiment, this resist layer covers not only the edge surface of the MR stripe, but also covers the edge surfaces of the first and second insulative gap layers G1 and G2 and the first and second shield layers S1 and S2 which are coextensive in width with the MR stripe at the ABS. This results in a resist layer strip which extends transversely to the layers of the MR read head at the ABS. In the preferred embodiment, this strip has a lateral width which is large enough to extend slightly beyond the lateral width of the MR head and cover a portion of each lead, thereby protecting any stabilization layers adjacent the MR stripe. After the resist layer is formed, the MR read head is etched at its ABS to remove conductive material bridging between the lead layers and the shield layers. The preferred etching is reactive ion etching (RIE), which is especially effective in eliminating the electrical shorts and removing only about 500Å of the uncovered edge surfaces. The removal of 500Å of material is effective in eliminating conductive material bridging between the conductive leads L1 and L2 and the conductive shield layers S1 and S2 without altering the performance of the MR read head. The present method is especially adaptable for batch fabrication of multiple MR read heads or merged MR heads which are arranged in rows and columns. A plurality of strips of resist are formed over columns of MR stripes and then the entire batch of rows is etched by RIE to remove the conductive material streaked across the first and second gap layers at the ABS.

An object of the present invention is to provide a method of eliminating lead to shield shorts at the ABS of an MR read head.

Another object is to overcome the problem of electrical shorts between edge surfaces of the conductive leads and the edge surfaces of the conductive shield layers at the ABS.

A further object is to provide a method of removing conductive material streaked across the edge surfaces of the first and second gap layers at the ABS of an MR read head caused by lapping the MR read head after the formation of its thin film layers.

Yet another object is to provide a higher yield in the batch fabrication of multiple MR read heads by removing electrical shorts between the ABS edge surfaces of the conductive leads and the ABS edge surfaces of the conductive shield layers after lapping.

These and other objects of the present invention will become apparent to those skilled in the art by the following description.

DETAILED DESCRIPTION OF THE PREFERRED EMBODIMENTS

Figure 1:
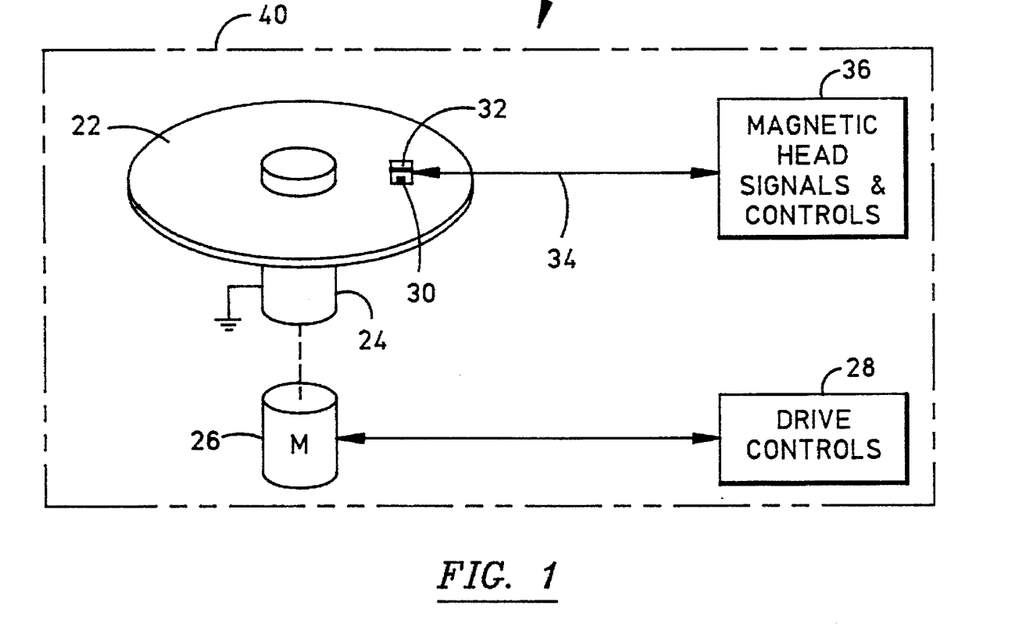
FIG. 1 is a schematic illustration of an exemplary magnetic disk drive which employs the present MR read head in conjunction with a slider which is located above a rotating magnetic disk.

Referring now to the drawings wherein like reference numerals designate like or similar parts throughout the several views, there is illustrated in FIG. 1 a magnetic disk drive 20 which includes a rotatable magnetic disk 22. The disk 22 is supported by a spindle 24 which is rotated by a motor 26, the motor 26 being controlled by a drive control circuit 28. A thin film MR read head 30 is mounted on a slider 32 which in turn is supported by a suspension 34. Typically a write head (not shown) is combined with the MR read head 30 so that signals can be written and read with the same slider 32. The signals to and from the combined head and its movements with respect to the magnetic disk 22 are controlled by magnetic head signals and controls 36. When the disk 22 is rotated, the slider 32 is supported above the disk by a cushion of air (air bearing) which is generated by the movement of the disk 22. During the movement of the disk 22, the head 30 is positioned in a transducing relationship with respect to a circular data track shown at 38 in FIG. 2. The bottom surfaces of the slider 32 and the head 30 are in a plane which is called the air bearing surface (ABS). The ABS is spaced from the surface of the disk 22 by a distance in the order of 0.075 μm when the disk is rotating. The above components are mounted within a housing 40.

Figure 2:
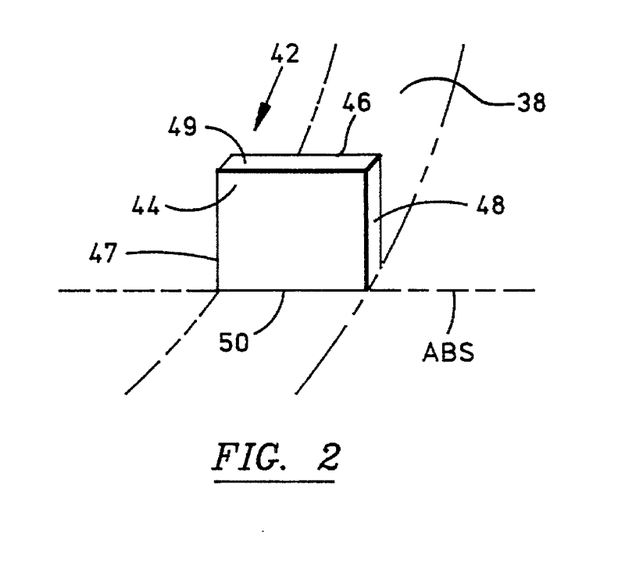
FIG. 2 is a schematic isometric illustration of a single MR stripe of an MR read head located above a circular track of a magnetic disk rotating therebelow.
Figure 3:
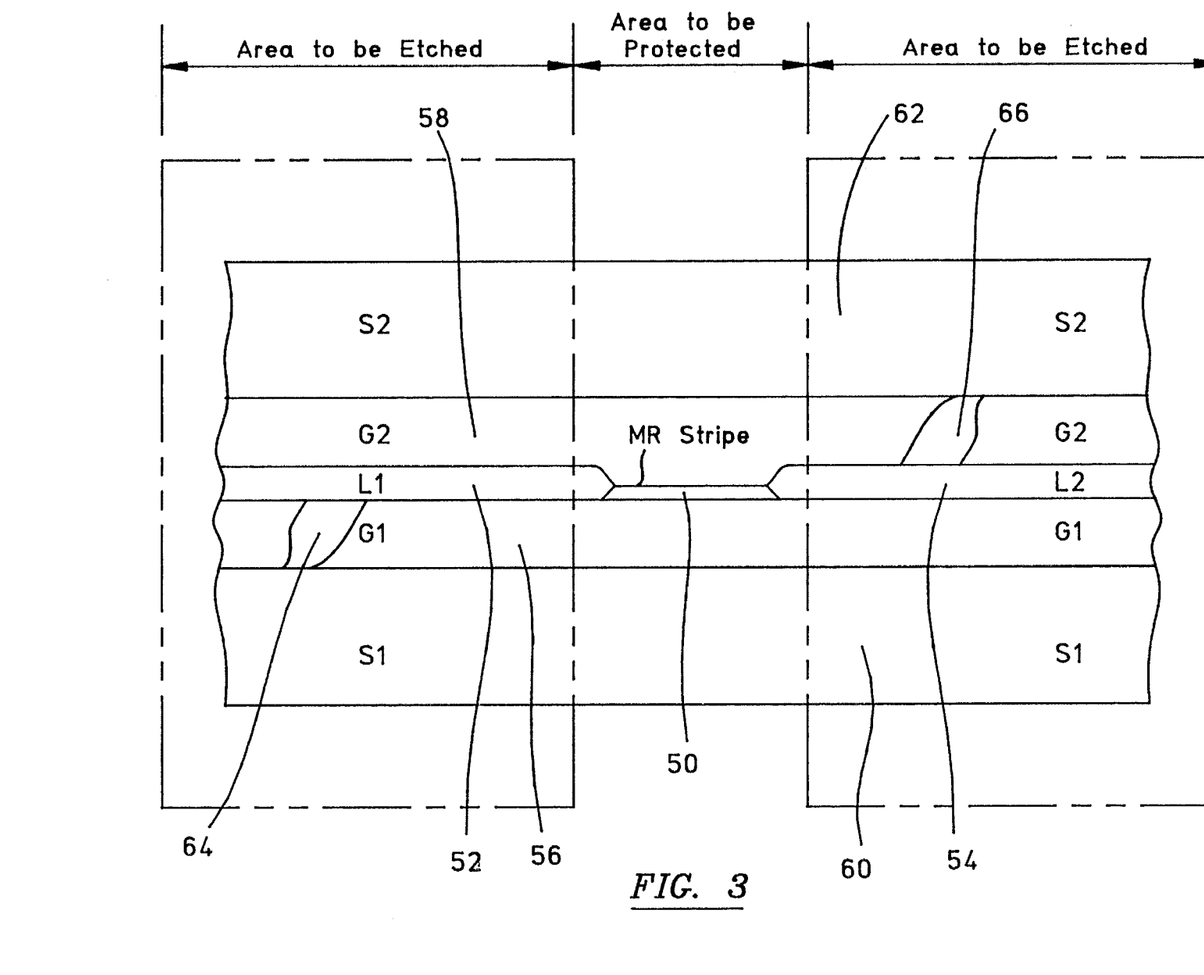
FIG. 3 is an ABS view of an MR read head with several streaks of conductive material causing electrical shorts between the lead layers L1 and L2 and the first and second shield layers S1 and S2.

The MR read head 30 includes an MR layer or stripe 42 which is shown schematically in FIG. 2 above the circular track 38. As shown in FIG. 3, the MR stripe is sandwiched between a pair of insulative gap layers G1 and G2, which in turn are sandwiched between a pair of shield layers S1 and S2. For a more detailed description of a complete structure of an MR read head, refer to commonly assigned patent application of Heim and Gill, Ser. No. 08/103,487, which is incorporated by reference herein. All of the layers of the MR read head are thin films, which are constructed by well-known frame plating and photoetching techniques. As shown in FIG. 2, the MR stripe 42 is a thin film which has first and second film surfaces 44 and 46 which are bounded by lateral edges 47 and 48 and top and bottom edges 49 and 50, the bottom edge 50 having a surface which forms a portion of the ABS of the MR read head.

The bottom edge surface 50 of the MR stripe is shown in FIG. 3. Connected to the lateral edges 47 and 48 of the MR stripe are first and second lead layers L1 and L2. The lead layers L1 and L2 also have edge surfaces 52 and 54, respectively, which form a portion of the ABS. In the same manner, the first and second gap layers G1 and G2 have edge surfaces 56 and 58 which form a portion of the ABS. In a like manner, the first and second shield layers S1 and S2 have edge surfaces 60 and 62 which form a portion of the ABS.

After the thin film layers of the MR read head are formed, the head is subjected to lapping, which is a fine grinding process transverse to the film surfaces of the layers. This lapping forms the ABS. Unfortunately, the lapping sometimes streaks conductive material shown at 64 and 66 between the edge surfaces of the lead layers L1 and L2 and the edge surfaces of the first and second shield layers S1 and S2. This material primarily comes from the large shield layers S1 and S2. The function of the gap layers G1 and G2 is then compromised. The material 64 and 66 streaked between the leads L1 and L2 and the shields S1 and S2 shorts the leads to the shields and significantly decreases the magnitude of the sense current conducted by the MR stripe 50. Reduction of sense current magnitude reduces readback signal amplitude, and may render the MR read head essentially useless. During production, these useless MR read heads are discarded, thereby decreasing the yield of the production run.

Typical materials for the thin film layers of the MR read head are known. The MR stripe may be fabricated from Permalloy, which is NiFe; the conductive leads L1 and L2 include layers of Ta, Au, Ta; the first and second shield layers S1 and S2 may include Sendust and Permalloy, respectively; and the first and second gap layers G1 and G2 may be fabricated from $Al_2O_3$. The streaks of conductive material 64 and 66 in FIG. 3 which bridge the edge surfaces of the leads L1 and L2 and the edge surfaces of the shields S1 and S2 are caused by the lapping operation. The method of the invention essentially etches the surface edges 56 and 58 of the first and second insulative gap layers G1 and G2 to eliminate the electrical short circuits which the streaks form between the lead L1 and the shield S1 and to eliminate the electrical short between the lead L2 and the shield S2.

Figure 4:
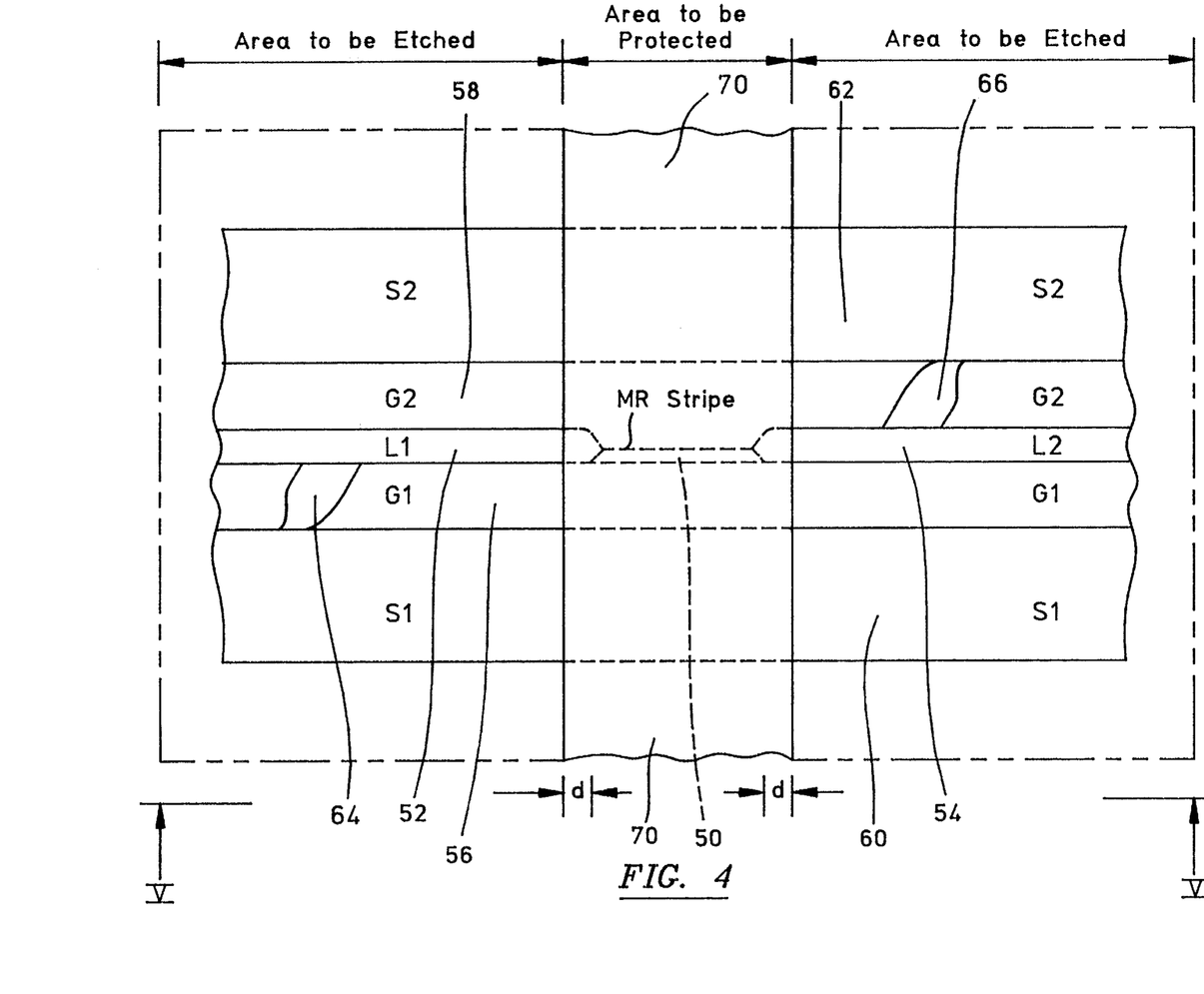
FIG. 4 is similar to FIG. 3 except a strip of resist has been formed as a layer to protect the MR stripe.

It is important that the method of etching the edge surfaces 56 and 58 of the first and second gap layers G1 and G2 not result in etching of the edge surface 50 of the MR stripe. In order to protect the edge surface 50 of the MR strip, a layer of photoresist 70 is deposited over the edge surface 50 of the MR stripe at the ABS, as shown in FIG. 4. It is preferred that this photoresist layer be a strip 70 which extends perpendicular to the film surfaces of the thin film layers of the MR read head. In this manner, the photoresist strip 70 also covers the edge surfaces 56 and 58 of the first and second gap layers G1 and G2 and the edge surfaces 60 and 62 of the first and second shield layers S1 and S2, which are essentially coextensive in width with the edge surface 50 of the MR stripe. It should be noted, however, that the width of the photoresist strip 70 extends slightly beyond the lateral width of the edge surface 50 of the MR stripe at the ABS. This extra width covers a portion of the edge surfaces of the leads L1 and L2, which are connected to the lateral edges of the MR stripe. As shown in FIG. 4, it is desirable that this extra width "d" on each side of the MR stripe be approximately 1 to 5 μm. This will assure protection for any hard biasing layers which are utilized for stabilizing the MR stripe.

Figure 5:
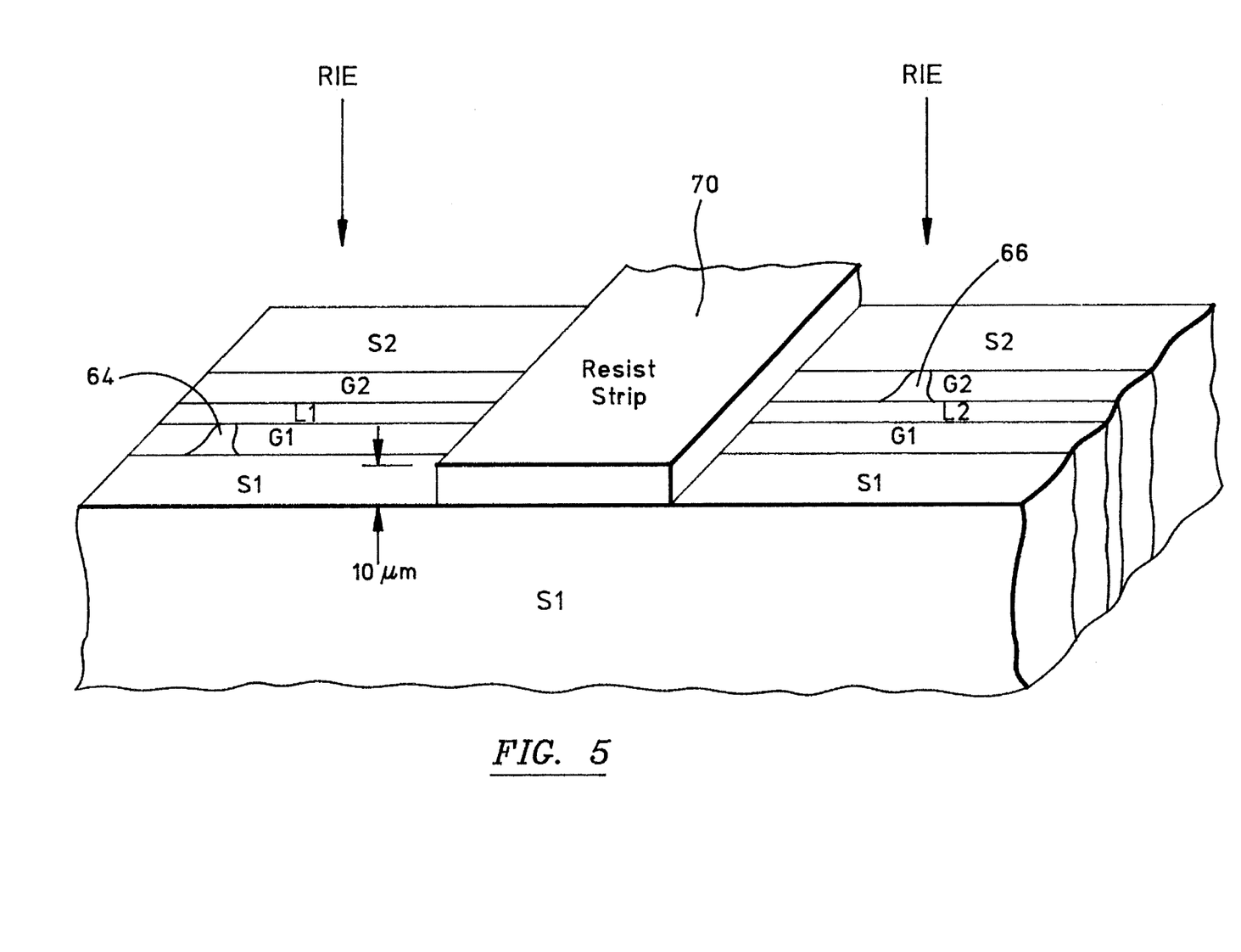
FIG. 5 is an isometric view taken along plane V—V of FIG. 4 with the edge surfaces of the uncovered layers at the ABS being subjected to etching, such as RIE.
Figure 6:
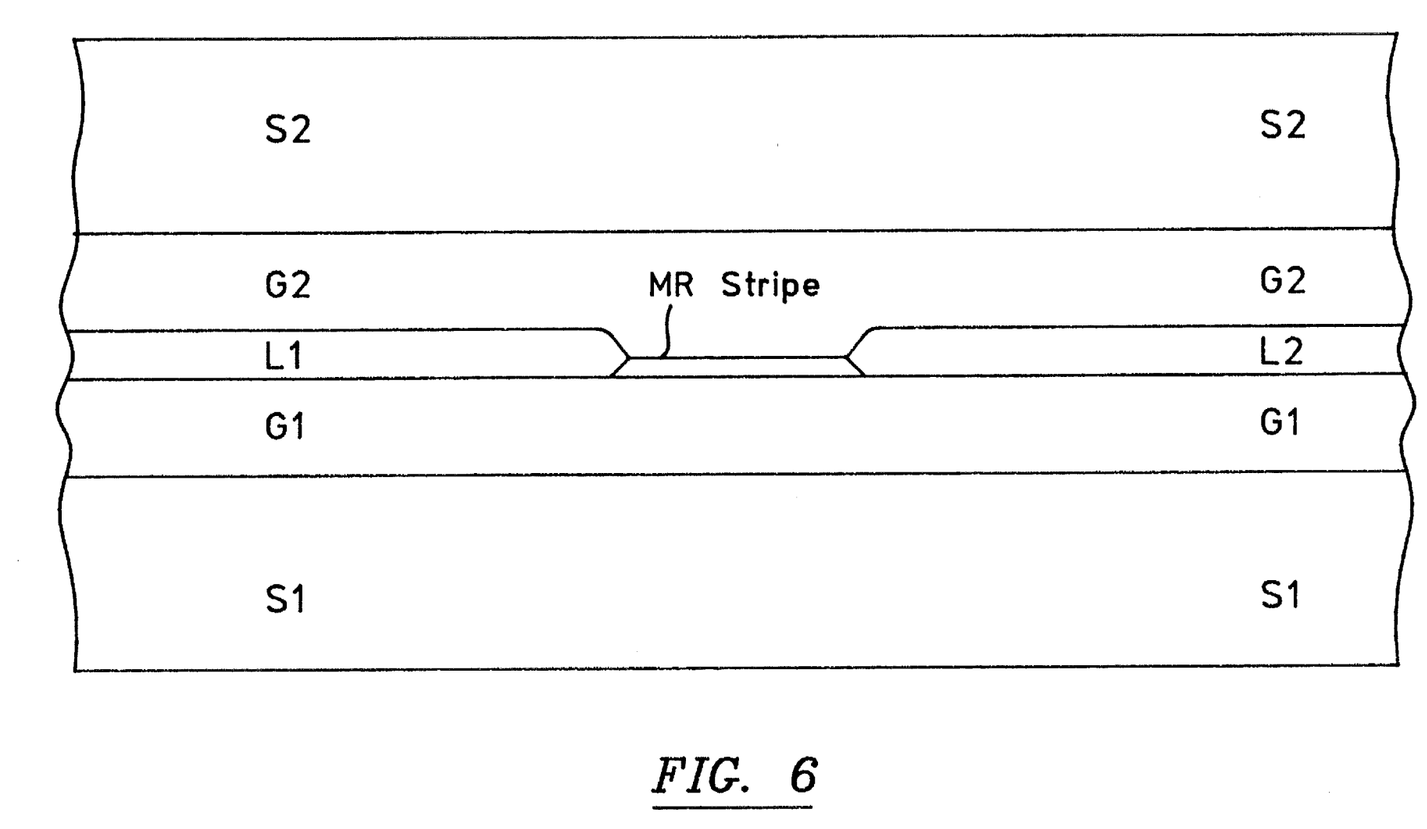
FIG. 6 is an ABS view of the MR read head after etching to remove the streaks of conductive material and after removal of the photoresist layer.

It is preferred that the thickness of the resist layer 70 be substantially 10 μm, as illustrated in FIG. 5 of the drawings. This has been found to be an optimum thickness of the resist layer to protect the MR stripe when the uncovered edge surfaces of the thin film layers are subjected to reactive ion etching (RIE) which is the preferred method of etching. Reactive ion etching is employed to remove about 500Å of the edge surfaces of the uncovered thin film layers at the ABS during the step shown in FIG. 5. This is adequate to remove the streaks of conductive material 64 and 66 shown in FIGS. 3–5 and yet not result in any damage to the MR stripe covered by the 10 μm thick photoresist strip 70. FIG. 6 shows the ABS view of the MR read head after the step of reactive ion etching, and after removal of the photoresist strip 70. The conductive streaks 64 and 66 shown in FIGS. 3–5 have been removed to render a previously useless MR read head fully operational for its intended purpose.

It should be understood that in the forming of the photoresist layers, a photoresist of approximately 10 μm thick is spun onto the MR read head and its substrate. Unwanted areas of the photoresist are then developed and removed with a solution to uncover the edge surfaces of the various thin film layers of the MR read head which are to be etched. After the etching process, the remaining photoresist layer, which protects the MR stripe, is removed by dissolving it in a solution.

Figure 7:
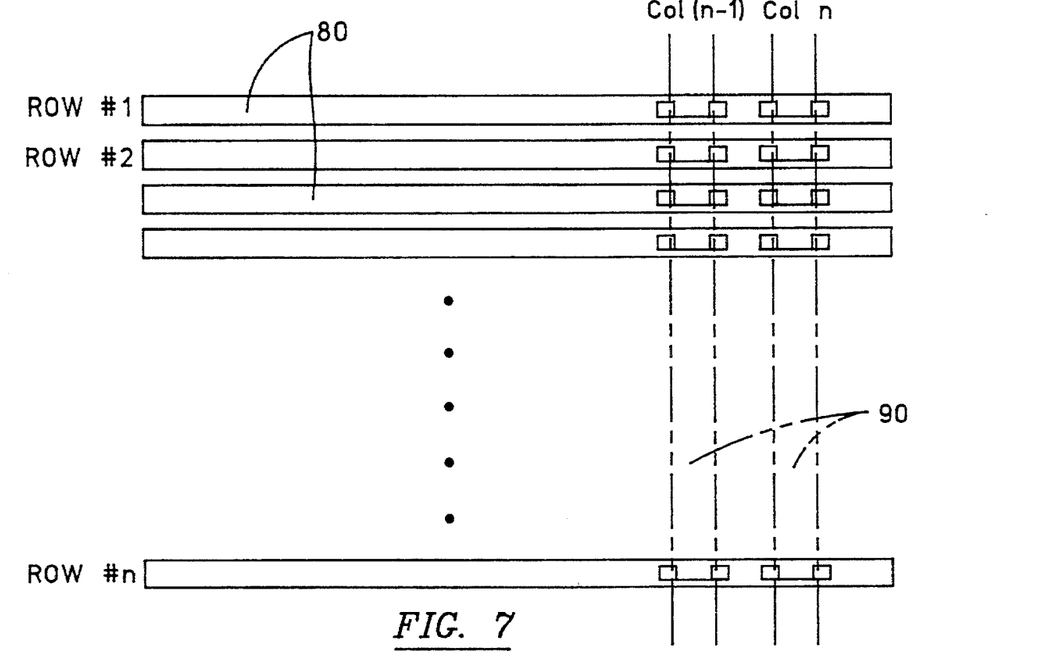
FIG. 7 is a schematic illustration of rows and columns of MR read heads after lapping.
Figure 8:
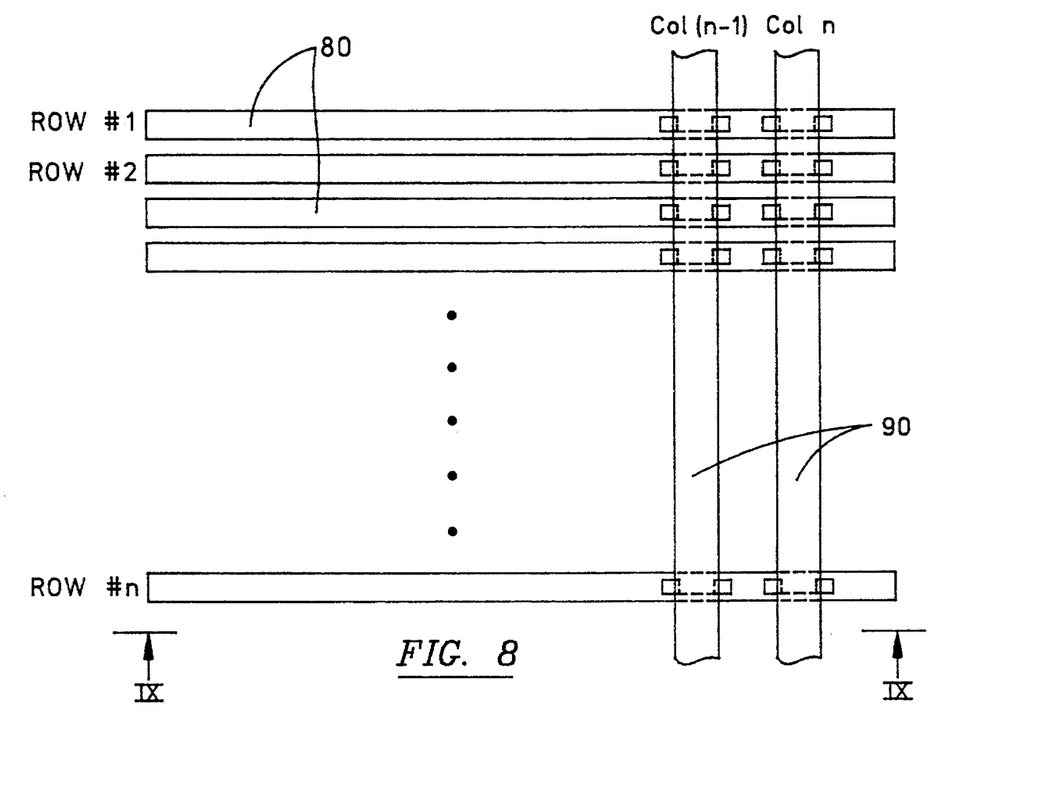
FIG. 8 is similar to FIG. 7 except the MR stripes in each column of MR stripes has been protected by a strip of photoresist along the column at the ABS.
Figure 9:
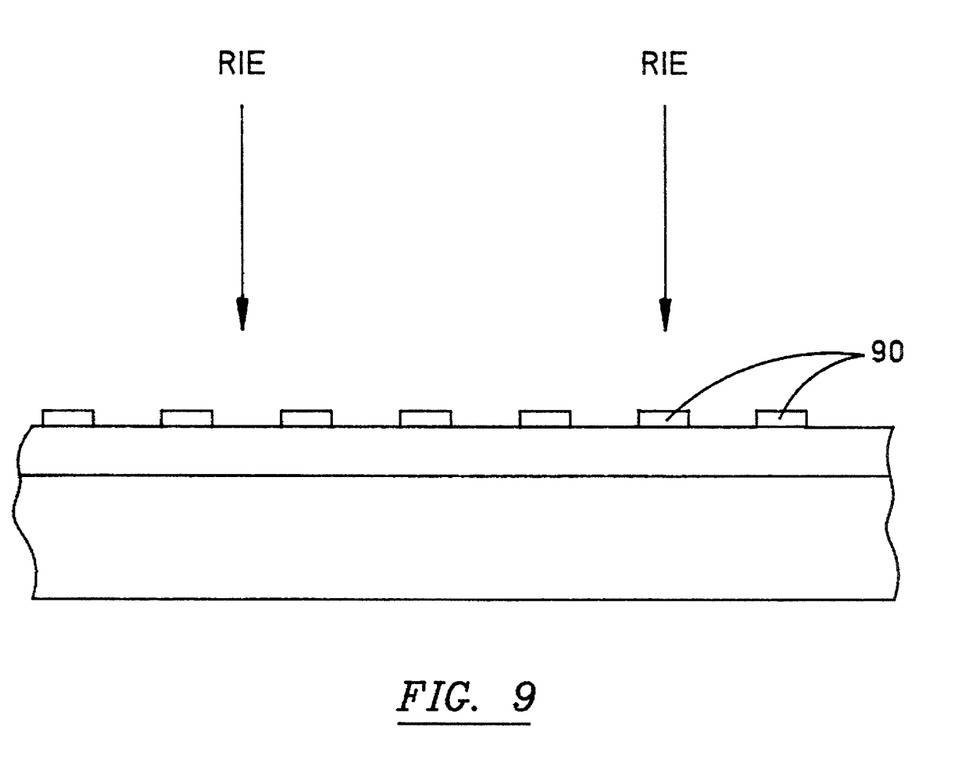
FIG. 9 is a view taken along plane IX—IX of FIG. 8 with the uncovered edge surfaces of the layers between the photoresist strips being subjected to etching, such as RIE.

FIGS. 7, 8, and 9 illustrate a batch production method for removing electrical shorts between leads and shields of a plurality of MR read heads. The MR read heads are formed sequentially on elongated substrates 80. The elongated substrates 80 may be affixed, such as by epoxy bonding, with the MR read heads arranged in rows and columns, as shown in FIG. 7. With this arrangement, the MR stripes are aligned in a plurality of columns. As shown in FIGS. 8 and 9 a layer of photoresist, preferably 10 μm thick, is formed over each column of MR stripes so as to cover the MR stripes in the column and preferably cover a portion of the leads L1 and L2 on each lateral side thereof, as discussed hereinabove. These photoresist layers 90 are elongated strips which extend perpendicular to the thin film layers of the MR read heads and which extend perpendicular to the longitudinal axes of the substrates 80, as illustrated in FIG. 8. Left uncovered are the remainder of the edge surfaces of the lead layers L1 and L2, the edge surfaces of the insulative gap layers G1 and G2, and the edge surfaces of the conductive shield layers S1 and S2, as described hereinabove with reference to the single MR read head, illustrated in FIGS. 3–6.

After forming the photoresist strips 90, the rows and columns of MR read heads are subjected to reactive ion etching, as illustrated in FIG. 9. As stated hereinabove, this etching is employed to remove only about 500Å of the uncovered edge surfaces of the MR read heads at the ABS. The 10 μm thickness of the photoresist strips 90 fully protects the MR stripes from this etching process. After the etching process, the photoresist strips 90 are removed, the substrates 80 are removed from the wafer (not shown), and the substrates 80 are diced to provide individual MR read heads, one of which is illustrated in FIG. 6.

The present invention is especially useful in batch production of MR stripes to remove electrical shorts between the leads and the shields. By aligning the MR stripes, as shown in FIG. 7, the photoresist layer is easy to form as a strip along each column of MR stripes, as shown in FIG. 8. The etching process will obviously etch some MR heads which have no electrical shorts between the leads and the shields. However, the MR heads which do have electrical shorts between the leads and the shields are salvaged so that a 100% yield is obtained in the production run in the category of electrical shorting at the ABS.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

I claim:

1. A method of eliminating lead to shield shorts at the air bearing surface (ABS) of a magnetoresistive (MR) read head where the MR read head includes an MR stripe and a pair of conductive leads sandwiched between first and second insulative gap layers, the first and second insulative gap layers being sandwiched between first and second conductive shield layers, each of the MR stripe, the pair of conductive leads, the first and second insulative gap layers, the first and second conductive shield layers having an edge surface at the ABS of the MR read head, the pair of leads being connected to the MR stripe at opposite ends of the surface edge of the MR stripe, the method comprising the step of:

etching the edge surfaces of the first and second insulative gap layers to remove conductive material between the pair of leads and the first and second conductive shields layers; and during the step of etching, protecting the edge surface of the MR stripe from being etched.

2. A method as claimed in claim 1 wherein:

the step of protecting the edge surface of the MR stripe includes depositing a resist layer on the ABS to cover the MR stripe and portions of the edge surfaces of the first and second insulative gap layers and the first and second conductive shield layers which are substantially coextensive in width with the MR stripe.

3. A method as claimed in claim 2 wherein:

the step of depositing a resist layer on the ABS includes a step of depositing a resist layer substantially 10 microns thick.

4. A method as claimed in claim 2 wherein:

the step of depositing a resist layer on the ABS also covers a portion of each edge surface of each conductive lead from a respective end of the edge surface of the MR stripe.

5. A method as claimed in claim 4 including:

the step of depositing a resist layer on the ABS covering a width of 1–5 microns of each edge surface of each conductive lead from a respective end of the edge surface of the MR stripe.

6. A method as claimed in claim 2 wherein:

the resist layer covers substantially a 10 micron width portion of the edge surfaces of the MR stripe, the first and second insulative gap layers and the first and second conductive shield layers which are coextensive in width with the MR stripe.

7. A method as claimed in claim 2 wherein:

the step of etching includes a step of reactive ion etching the surface edges of the first and second insulative gap layers to remove conductive material lying across the first and second insulative gap layers between the pair of conductive leads and the first and second conductive shield layers.

8. A method as claimed in claim 7 wherein:

the step of depositing a resist layer on the ABS includes a step of depositing a resist layer substantially 10 microns thick.

9. A method as claimed in claim 8 wherein:

the step of depositing a resist layer on the ABS also covers a portion of each edge surface of each conductive lead from a respective end of the edge surface of the MR stripe.

10. A method as claimed in claim 9 wherein:

the step of depositing a resist layer on the ABS covers a width of 1–5 microns of each edge surface of each conductive lead from a respective end of the edge surface of the MR stripe.

11. A method of eliminating lead to shield electrical shorts at the air bearing surface (ABS) of a plurality of magnetoresistive (MR) read heads which are arranged in rows and columns, where each MR read head includes an MR stripe and a pair of conductive leads sandwiched between first and second insulative gap layers, the first and second insulative gap layers being sandwiched between first and second conductive shield layers, each of the MR stripe, the pair of conductive leads, the first and second insulative gap layers, the first and second conductive shield layers having an edge surface at the ABS of the read head, each pair of conductive leads being connected at opposite ends of the edge surface of a respective MR stripe, the method comprising the steps of:

depositing a resist layer over each column of MR stripes; and reactive ion etching between the columns of MR stripes to etch the edge surfaces of the first and second insulative gap layers of each MR head to remove conductive material between the pair of leads and the first and second conductive shields layers of each MR head.

12. A method as claimed in claim 11 wherein:

the step of depositing a resist layer includes depositing a resist layer of substantially 10 microns thick over each column of MR stripes.

13. A method as claimed in claim 12 wherein:

the step of depositing a resist layer covers a portion of each conductive lead adjacent the MR stripe.

* * * * *